United States Patent
Chou et al.

(10) Patent No.: US 12,124,854 B2
(45) Date of Patent: Oct. 22, 2024

(54) COMPUTER PROGRAM PRODUCT THAT INCLUDES A FIRMWARE STRUCTURE, AND BOOTING METHOD FOR A CONTROL SYSTEM

(71) Applicant: FLYTECH TECHNOLOGY CO., LTD., Taipei (TW)

(72) Inventors: Li-Chun Chou, Taipei (TW); Shui-Chin Tsai, Taipei (TW); Ting-You Liou, Taipei (TW); Chien-Lin Su, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 143 days.

(21) Appl. No.: 17/747,965

(22) Filed: May 18, 2022

(65) Prior Publication Data

US 2023/0236838 A1 Jul. 27, 2023

(30) Foreign Application Priority Data

Jan. 27, 2022 (TW) .................................. 111103680

(51) Int. Cl.
*G06F 9/4401* (2018.01)
*G06F 8/65* (2018.01)
*G06F 8/654* (2018.01)

(52) U.S. Cl.
CPC ............ *G06F 9/4401* (2013.01); *G06F 8/654* (2018.02); *G06F 8/66* (2013.01)

(58) Field of Classification Search
None
See application file for complete search history.

(56) References Cited

U.S. PATENT DOCUMENTS 7,318,151 B1  1/2008  Harris
8,661,425 B1 * 2/2014  Polyudov .............. G06F 8/4436
                                           717/165

(Continued)

FOREIGN PATENT DOCUMENTS

CN  101131645 A  2/2008
TW  201349114 A  12/2013

(Continued)

OTHER PUBLICATIONS

Search Report appended to an Office Action, which was issued to Taiwanese counterpart application No. 111103680 by the TIPO on Sep. 8, 2022, with an English translation thereof (2 pages).

(Continued)

*Primary Examiner* — Paul Yen
(74) *Attorney, Agent, or Firm* — HSML P.C.

(57) ABSTRACT

A computer program product embodied on a non-transitory computer readable medium of a control system includes a firmware program file, a signature detection module that causes a processor to detect whether a pre-defined signature is present; a booting module that causes the processor to perform, after it is determined that the pre-defined signature is not present in the main block, operations of power management and pin initiation included in the booting sequence; and a flashing module that causes the processor to perform, in response to receipt of a flashing command, a flashing operation that includes overwriting the firmware program file with an update firmware program file.

9 Claims, 9 Drawing Sheets

(56) References Cited

U.S. PATENT DOCUMENTS

| | | | |
|---|---|---|---|
| 2004/0030877 A1* | 2/2004 | Frid | G06F 8/654 713/1 |
| 2014/0047428 A1 | 2/2014 | Prakash et al. | |
| 2021/0326149 A1* | 10/2021 | Runyan | G06F 1/3218 |

FOREIGN PATENT DOCUMENTS

| | | |
|---|---|---|
| TW | 201502991 A | 1/2015 |
| TW | 202132973 A | 9/2021 |
| TW | 202137007 A | 10/2021 |

OTHER PUBLICATIONS

Search Report issued to European counterpart application No. 22174361.0 by the EPO on Nov. 8, 2022 (23 pages).

* cited by examiner

COMPUTER PROGRAM PRODUCT THAT INCLUDES A FIRMWARE STRUCTURE, AND BOOTING METHOD FOR A CONTROL SYSTEM

CROSS-REFERENCE TO RELATED APPLICATION

This application claims priority of Taiwanese Patent Application No. 111103680, filed on Jan. 27, 2022.

FIELD

The disclosure relates to a computer program product that includes a firmware structure, and a booting method for a control system.

BACKGROUND

A microcontroller unit (MCU) is a micro scale computing unit that incorporates a number of components, such as a central processing unit (CPU), a storage component (e.g., flash memory), a counter, and/or an input/output (I/O) interface, on a single integrated circuit (IC) chip. With a relatively smaller size and wide range of functionalities, MCUs may be applicable in many fields such as computing, household appliances, manufacturing, medical industry, aerospace, etc.

The term "firmware" refers to software instructions that control operations of hardware components. In operations, the CPU of the MCU continuously accesses the flash memory to obtain the software instructions stored therein, and to perform the associated operations. In many occasions, the firmware stored in the flash memory is to be updated to a newer version or replaced. To do so, a new firmware file (in a format of, for example, .bin) may be written into the flash memory, a process known as "flashing". The process of flashing may be done using a flashing tool such as a software application or an external hardware tool.

It is noted that during the process of flashing, a number of errors may occur (e.g., hardware malfunction, power outage, human error, etc.), causing the process of flashing to be terminated and the new firmware file not completely written into the flash memory. This may cause the MCU to be unable to perform some or all of the functionalities. In some cases, the errors of the process of flashing cannot even be fixed by repeating the process of flashing.

Also, since the MCUs have a wide range of applications, multiple sets of customized firmware may be created and flashed into different MCUs. In one example, for MCUs used in a specific system A, the customized firmware for controlling a generic pin (e.g., the general purpose input/output (GPIO)) of the system A may be named "ForIO_A.bin". For MCUs used in another specific system B, another customized firmware for controlling a generic pin (e.g., the general purpose input/output (GPIO)) of the system B may be named "ForIO_B.bin". As a result, maintaining a large number of customized firmware individually may be time consuming.

SUMMARY

Therefore, an object of the disclosure is to provide a computer program product that can alleviate at least one of the drawbacks of the prior art.

According to one embodiment of the disclosure, the computer program product embodied on a non-transitory computer readable medium of a control system. The non-transitory computer readable medium includes a main block and a boot block that are separate from each other. The computer program product includes:

a firmware program file that is stored in the main block;

a signature detection module that is stored in the boot block, the signature detection module including instructions that, when executed by a processor of the control system, cause the processor to perform, at the start of a booting sequence of the control system, operations of detecting whether a pre-defined signature associated with the booting sequence is present in the main block;

a booting module that is stored in the boot block, the booting module including instructions that, when executed by the processor, cause the processor to perform, after it is determined that the pre-defined signature is not present in the main block, operations of power management and pin initiation included in the booting sequence; and a flashing module that is stored in the boot block, the flashing module including instructions that, when executed by the processor, cause the processor to perform, in response to receipt of a flashing command, a flashing operation that includes overwriting the firmware program file with another firmware program file.

Another object of the disclosure is to provide a booting method for a control system.

According to one embodiment of the disclosure, the control system includes a processor and a memory module that includes a main block which stores a firmware program file therein, and a boot block. The boot block stores a signature detection module, a booting module, and a flashing module therein. The method is implemented using the processor and includes:

executing the signature detection module to perform, at the start of a booting sequence of the control system, operations of detecting whether a pre-defined signature associated with the booting sequence is present in the main block;

when it is determined that the pre-defined signature is not present in the main block, executing the booting module to perform operations of power management and pin initiation included in the booting sequence; and executing the flashing module to perform, in response to receipt of a flashing command, a flashing operation that includes overwriting the firmware program file with another firmware program file.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
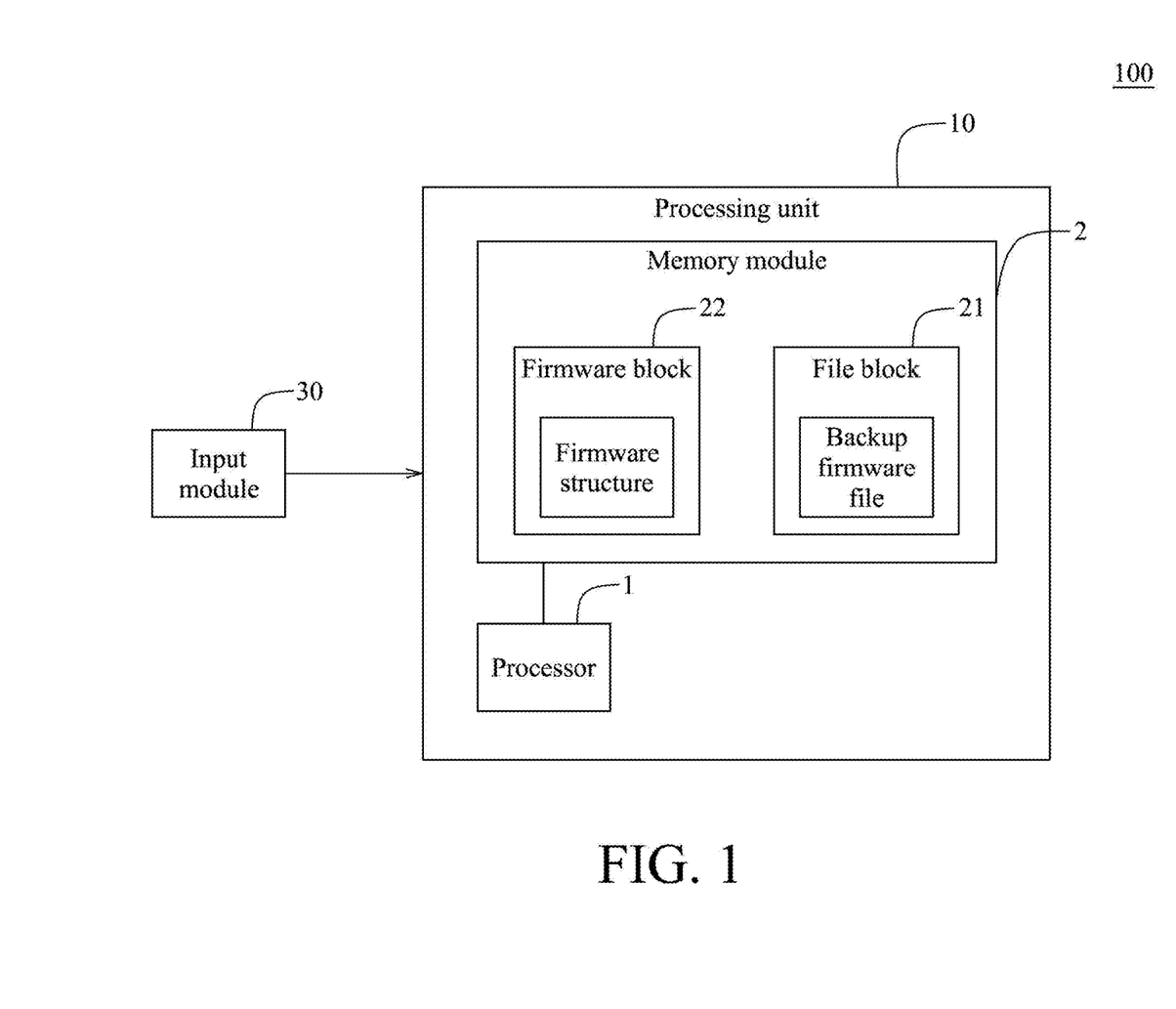
FIG. 1 is a block diagram illustrating components of a control system according to one embodiment of the disclosure.

FIG. 1 is a block diagram illustrating components of a control system 100 according to one embodiment of the disclosure. The control system 100 includes a processing unit 10, and an input module 30 coupled to the processing unit 10.

In this embodiment, the processing unit 10 is embodied using a microcontroller unit (MCU) in the form of a system on a chip (SoC), and includes a processor 1 and a memory module 2.

The processor 1 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory module 2 may be embodied using, for example, random access memory (RAM), read only memory (ROM), programmable ROM (PROM), firmware, and/or flash memory, etc. In this embodiment, the memory module 2 includes a ROM and a reprogrammable memory such as flash memory, and includes a file block 21 and a firmware block 22.

Figure 4:
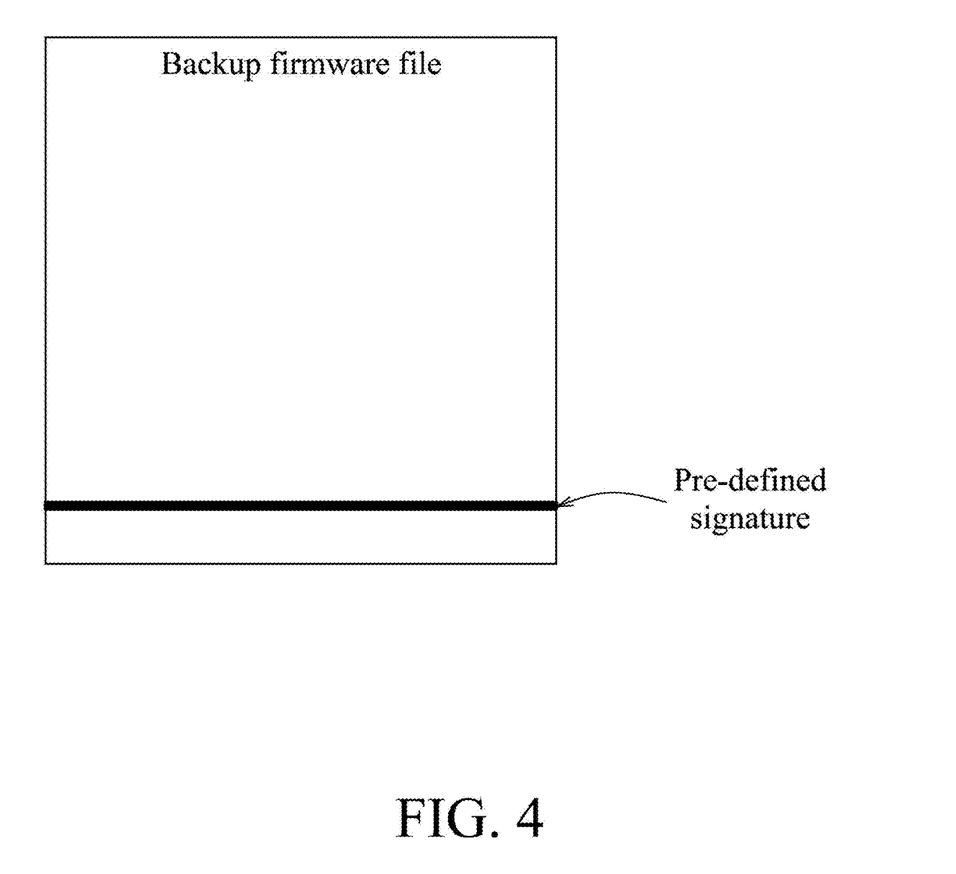
FIG. 4 illustrates an exemplary backup firmware program file.

In this embodiment, the file block 21 is embodied using the ROM and stores a backup firmware file therein. The firmware block 22 is embodied using the flash memory, and stores a firmware structure therein. As shown in FIG. 4, the backup firmware file stored in the file block 21 includes a pre-defined signature attached at an end of the backup firmware file. The pre-defined signature may be in the form of a specific signing code having a fixed length.

It is noted that while in this embodiment, the processing unit 10 is embodied using a SoC structure, in some embodiments, the memory module 2 and the processor 1 may be separate components that are coupled to each other. In some embodiments, the file block 21 and the firmware block 22 of the memory module 2 may be separate from each other. That is to say, one or both of the file block 21 and firmware block 22 of the memory module 2 are separate from and coupled to the processor 1.

The input module 30 may include a keyboard, a mouse and/or other devices that enable a user to interact with the control system 100.

Figure 2:
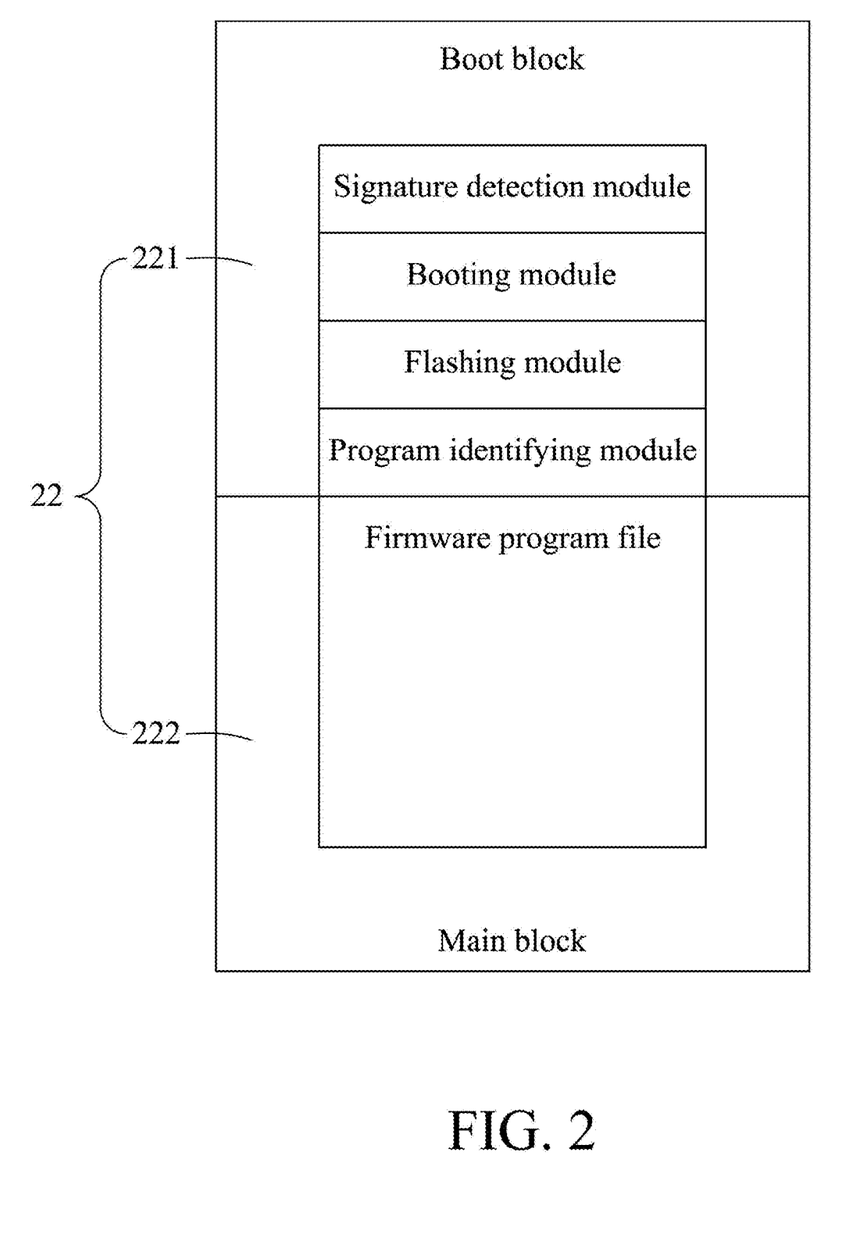
FIG. 2 is a block diagram illustrating components of a firmware block of a memory module of the control system according to one embodiment of the disclosure.

FIG. 2 is a block diagram illustrating components of the firmware block 22 of the memory module 2 according to one embodiment of the disclosure.

In this embodiment, the firmware block 22 includes a boot block 221 and a main block 222. It is noted that the boot block 221 of the memory module 2 is separate from the main block 222 of the memory module 2; that is to say, the boot block 221 cannot be a part of the main block 222, and vice versa. The firmware structure includes a firmware program file that is stored in the main block 222 of the memory module 2, a signature detection module that is stored in the boot block 221 of the memory module 2, a booting module that is stored in the boot block 221 of the memory module, a flashing module that is stored in the boot block 221 of the memory module 2, and a program identifying module that is stored in the boot block 221 of the memory module 2.

The firmware program file stored in the main block 222 includes a plurality of sub-programs and the pre-defined signature attached at an end thereof. Each of the plurality of sub-programs includes a unique header at a beginning of the sub-program.

Figure 3:
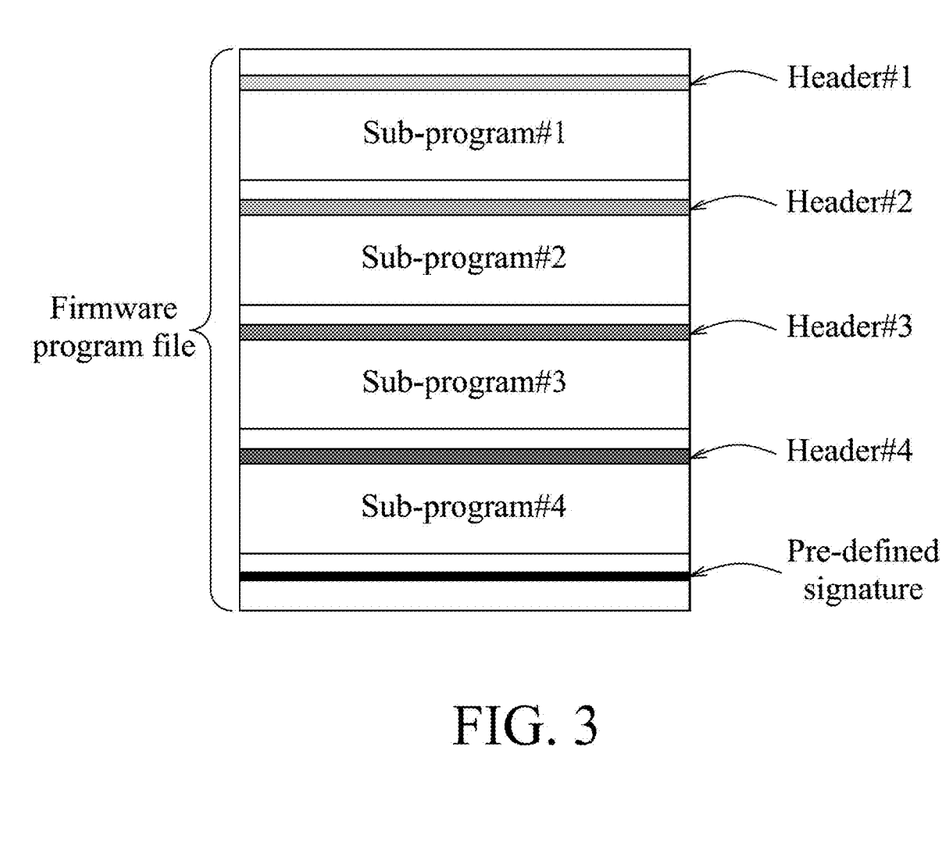
FIG. 3 is a diagram illustrating components of a firmware program file according to one embodiment of the disclosure.

In one example of FIG. 3, the firmware program file includes four sub-programs (sub-program #1, sub-program #2, sub-program #3 and sub-program #4), and four associated headers (header #1, header #2, header #3 and header #4). In other embodiments, additional sub-programs and headers may be present.

It is noted that the backup firmware file stored in the file block 21 may also include one or more of the sub-programs and the associated headers.

The signature detection module includes instructions that, when executed by the processor 1 of the control system 100, cause the processor 1 to perform, at the start of a booting sequence of the control system 100, operations of detecting whether a pre-defined signature associated with the booting sequence is present in the main block 222.

The booting module includes instructions that, when executed by the processor 1, cause the processor 1 to perform, after it is determined that the pre-defined signature is not present in the main block 222, operations of power management and pin initiation included in the booting sequence. It is noted that the booting sequence may include other operations for allowing the control system 100 to function, and the details thereof are omitted herein for the sake of brevity.

The flashing module includes instructions that, when executed by the processor 1, cause the processor 1 to perform, in response to receipt of a flashing command, a flashing operation that includes overwriting the firmware program file with another firmware program file.

The program identifying module includes instructions that, when executed by the processor 1, cause the processor 1 to perform, after the booting sequence has completed, in response to receipt of an input code, the operation of determining whether the input code is identical to one of the headers, and when it is determined that the input code is identical to one of the headers, executing one of the sub-programs that is associated with the one of the headers.

Figure 5:
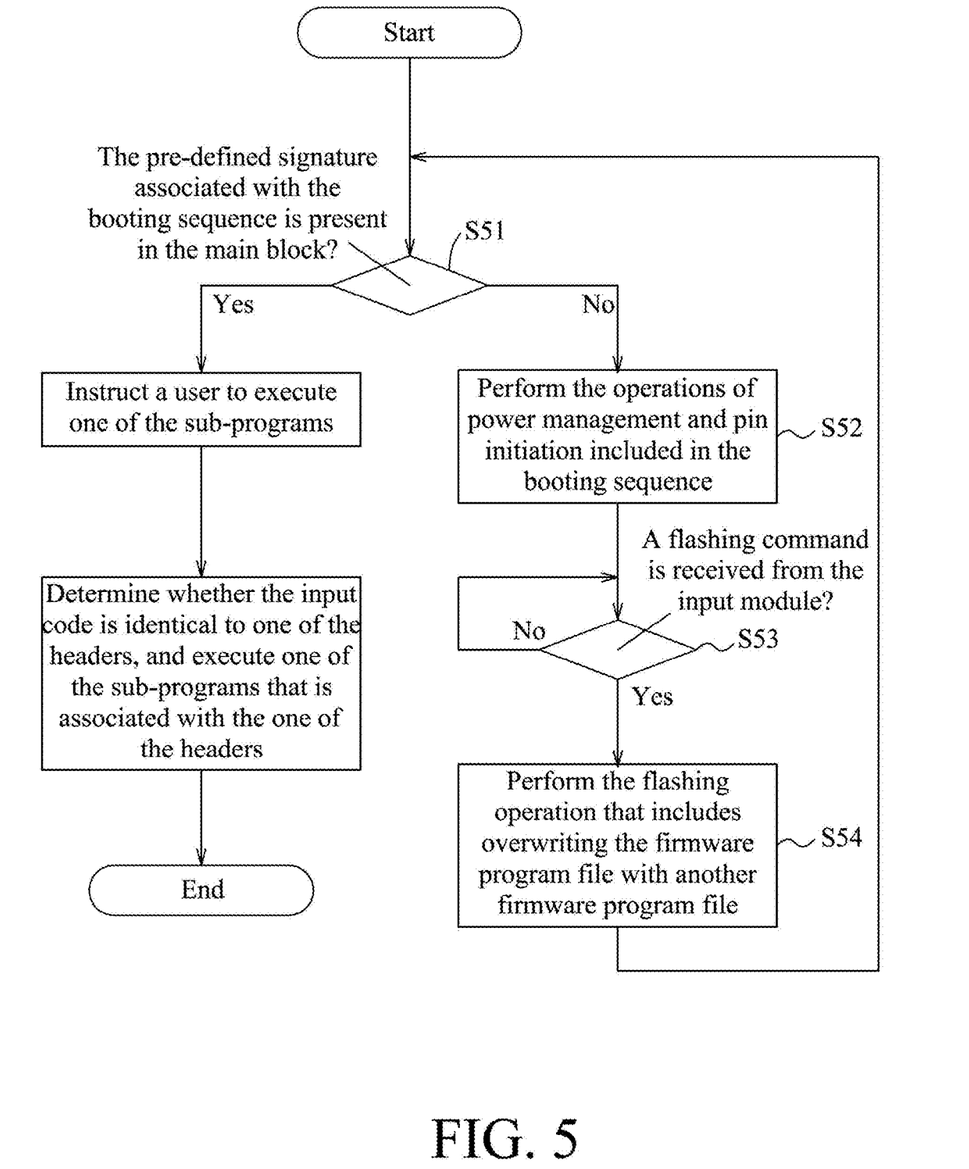
FIG. 5 is a flow chart illustrating steps of a booting method for the control system according to one embodiment of the disclosure.

FIG. 5 is a flow chart illustrating steps of a booting method for the control system 100 according to one embodiment of the disclosure. In this embodiment, the booting method is implemented using the processor 1 that executes the firmware structure as shown in FIG. 2.

In step S51, in response to receipt of a booting command (e.g., a user pressing a power button), the processer 1 starts the booting sequence and executes the signature detection module, so as to detect whether the pre-defined signature associated with the booting sequence is present in the main block 222 at the start of the booting sequence of the control system 100.

Specifically, the processor 1 is configured to detect the pre-defined signature at the end of the firmware program file stored in the main block 222. When the pre-defined signature is detected, it may be deduced that the firmware program file is completely stored in the main block 222, and the flow proceeds to step S55. Otherwise, it may be deduced that the firmware program file may be damaged or is incompletely stored in the main block 222 (e.g., the previous flashing operation did not complete, resulting in the failure to include the pre-defined signature at the end of the firmware program file), and the flow proceeds to step S52.

In step S52, the processor 1 executes the booting module, and performs the operations of power management and pin initiation included in the booting sequence. In this case, it is determined that the firmware program file stored in the main block 222 is incomplete, and some of the operations included in the booting sequence may not be available. As such, the instructions included in the booting module may ensure that at least the operations of power management and pin initiation associated with the processing unit 10 of the control system 100 may be implemented without trouble.

Then, in step S53, the processor 1 may generate a message indicating that the firmware program file is not complete, and needs to be updated. The processor 1 may then present the message using a display screen or an audio output component (not depicted in the drawings).

At this step, the processor 1 further determines whether a flashing command is received from the input module 30. When the flashing command is received from the input module 30, the flow proceeds to step S54.

In step S54, in response to receipt of the flashing command, the processor 1 executes the flashing module, and performs the flashing operation that includes overwriting the firmware program file with another firmware program file.

In this embodiment, the flashing command may be manually inputted by a user operating the input module 30, and the backup firmware program file is stored in the file block 221 of the memory module 2. The flashing command includes a locator (such as a Uniform Resource Locator) of the file block 221 of the memory module 2, and the flashing operation includes accessing the file block 221 of the memory module 2 based on the locator to obtain the backup firmware program file, and overwriting the firmware program file stored in the main block 222 with the backup firmware program file serving as said another firmware program file.

In some embodiments, after the flashing operation (step S54) are completed, the flow may go back to step S51 again, so as to determine whether the flashing operation is successfully implemented. That is to say, the processor 1 may determine again whether the pre-defined signature is detected at the end of the firmware program file stored in the main block 222. When it is determined that the flashing operation is not successfully implemented, the flow may proceed to steps S52 to S54 to perform the flashing operation again.

In step S55, after the booting sequence has completed, the processor 1 may generate a message instructing the user to execute one of the sub-programs. The processor 1 may then present the message using the display screen or the audio output component.

In step S56, in response to receipt of an input code (associated with execution of one of the sub-programs) from the input module 30, the processor 1 executes the program identifying module, and performs the operation of determining whether the input code is identical to one of the headers, and when it is determined that the input code is identical to one of the headers, executing one of the sub-programs that is associated with the one of the headers. The input module 30 is configured to generate and output the input code in response to user operation.

Using the example of FIG. 3, in one embodiment, the control system 100 is used to control a customized electronic device, and the sub-program used for controlling the customized electronic device is the sub-program #2. In such a case, after the user operates the input module 30 to input a code identical to the header #2, the processor 1 executes the sub-program #2 for controlling the customized electronic device.

Figure 6:
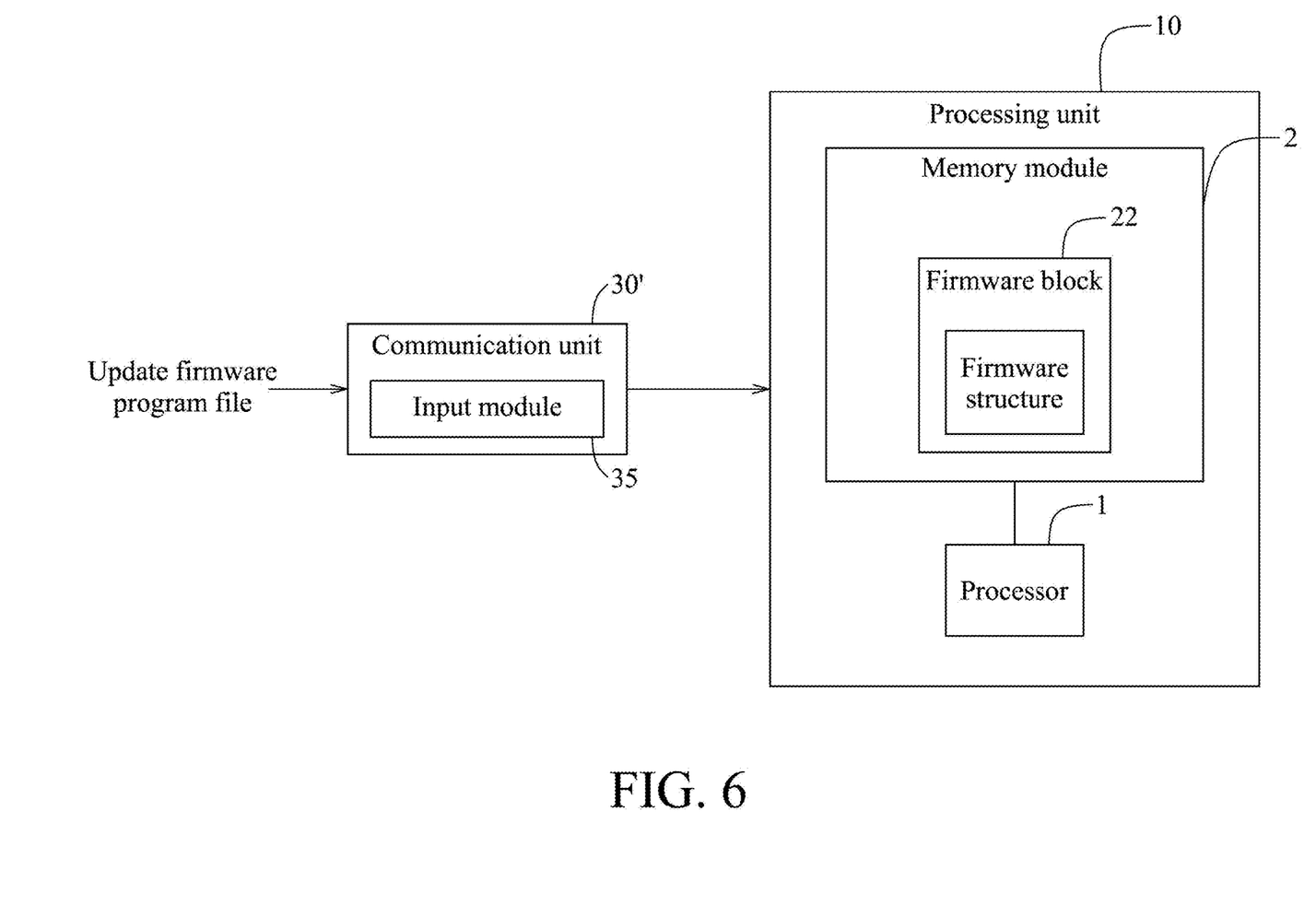
FIG. 6 is a block diagram illustrating components of a control system according to one embodiment of the disclosure.

FIG. 6 is a block diagram illustrating components of a control system 100' according to one embodiment of the disclosure.

In this embodiment, the control system 100' includes a processing unit 10' and an input module 30' coupled to the processing unit 10'.

The processing unit 10' is embodied using an MCU in the form of a SoC, and includes a processor 1 and a memory module 2'.

The processor 1 may be embodied using a processor that is similar to the one as shown in FIG. 1.

The memory module 2' may be embodied using, for example, random access memory (RAM), read only memory (ROM), programmable ROM (PROM), firmware, and/or flash memory, etc. In this embodiment, the memory module 2' includes a ROM and a reprogrammable memory such as flash memory, and includes a firmware block 22. That is to say, the file block 21 (see FIG. 1) is omitted in this embodiment.

In this embodiment, the firmware block 22 is embodied using the flash memory, and stores a firmware structure therein.

The input module 30' may include a keyboard, a mouse and/or other devices that enable a user to interact with the control system 100'. Additionally, in this embodiment, the input module 30' may include a communication unit 35 which may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fifth generation (5G) of wireless mobile telecommunications technology, and the like.

Figure 7:
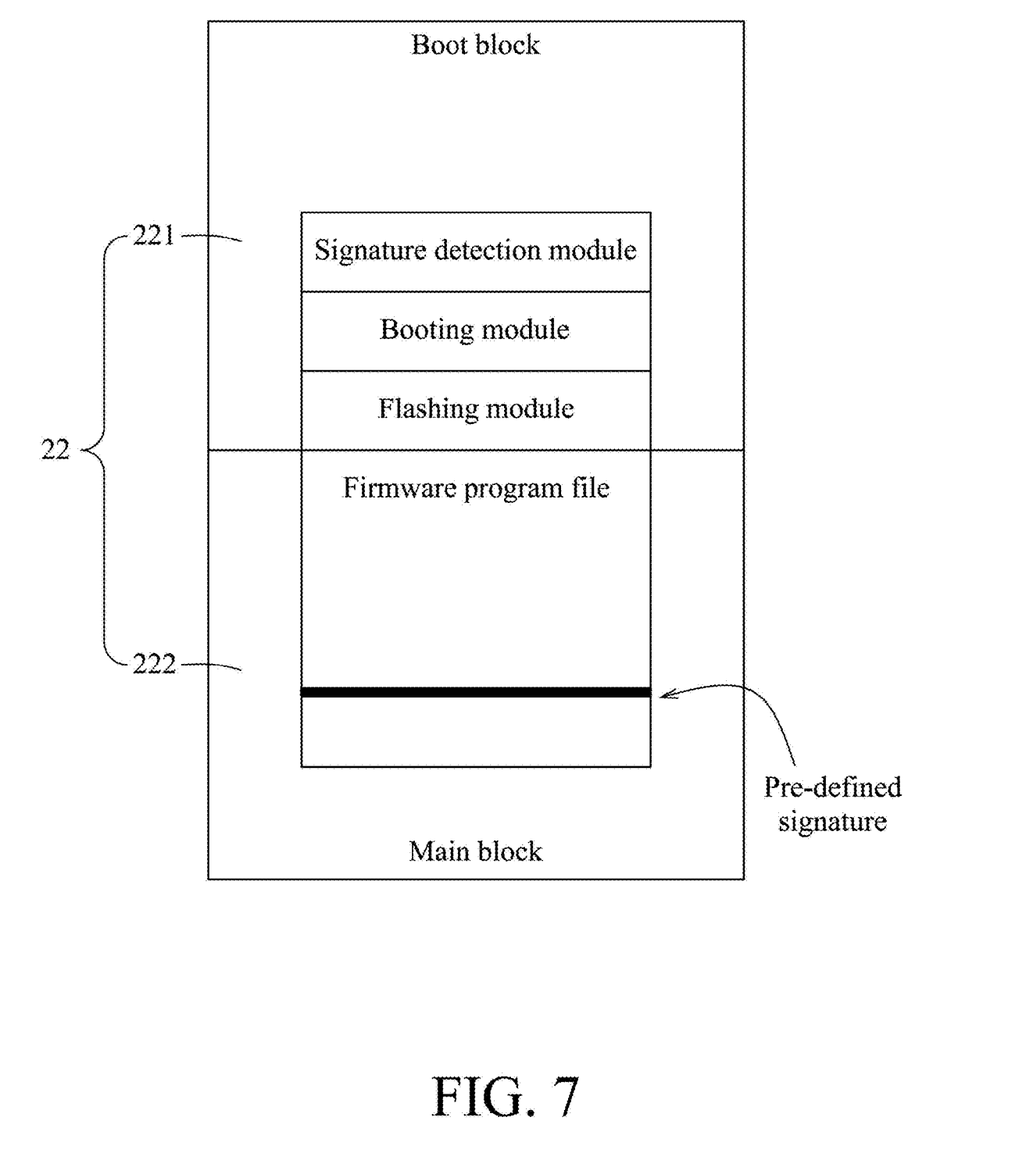
FIG. 7 is a block diagram illustrating components of a firmware block of a memory module of the control system according to one embodiment of the disclosure.

FIG. 7 is a block diagram illustrating components of the firmware block 22 of the memory module 2' according to one embodiment of the disclosure.

In this embodiment, the firmware block 22 includes a boot block 221 and a main block 222. It is noted that the boot block 221 of the memory module 2' is separate from the main block 222 of the memory module 2'. The firmware structure includes a firmware program file that is stored in the main block 222 of the memory module 2', a signature detection module that is stored in the boot block 221 of the memory module 2', a booting module that is stored in the boot block 221 of the memory module 2', and a flashing module that is stored in the boot block 221 of the memory module 2'. That is to say, the program identifying module is omitted in this embodiment.

It is noted that the instructions included in the signature detection module, the booting module and the flashing module are similar to those as described in the previous embodiments. As such, when executed by the processor 1, the signature detection module, the booting module and the flashing module cause the processor 1 to perform the operations that are similar to those as described in the previous embodiments.

The firmware program file stored in the main block 222 includes a pre-defined signature attached at an end thereof.

Figure 8:
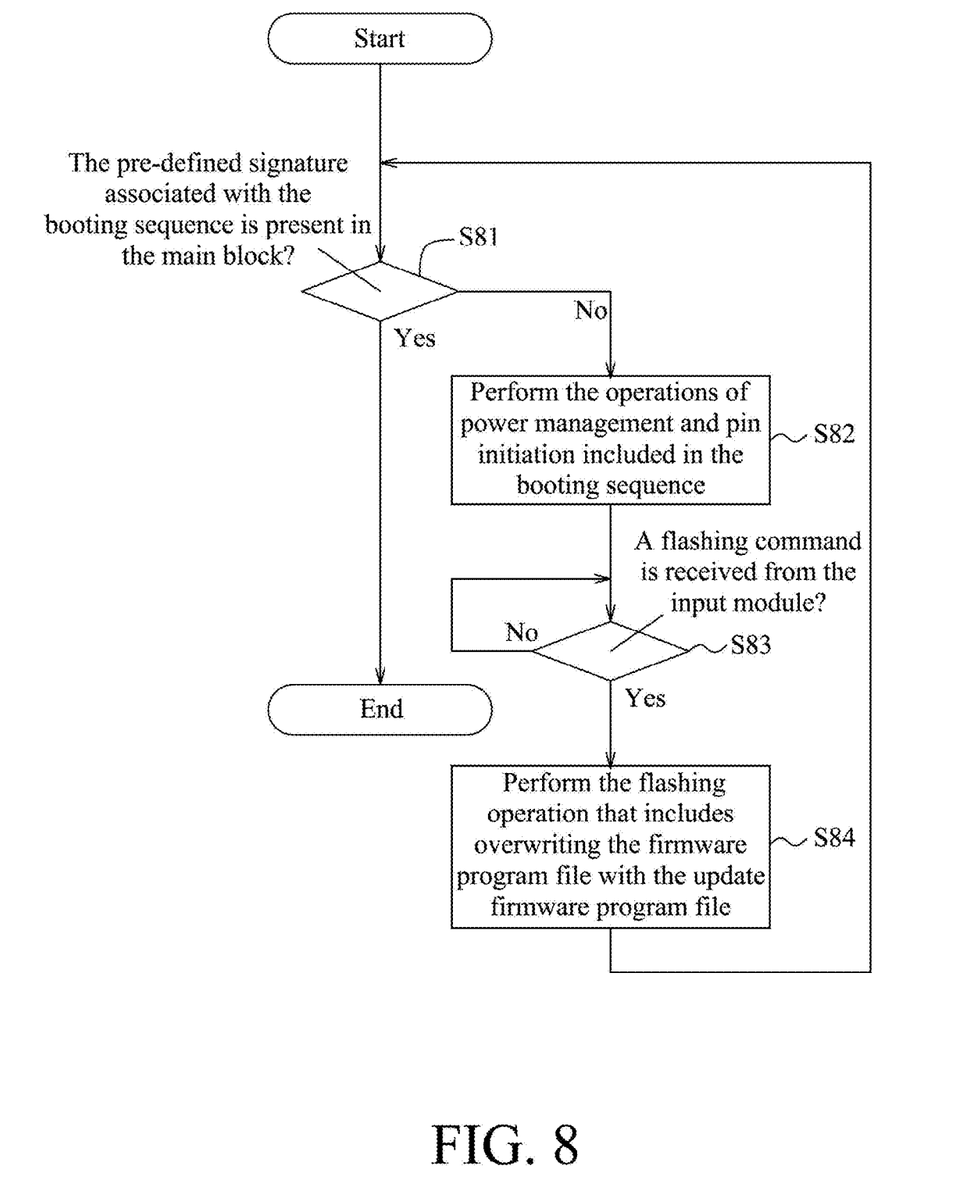
FIG. 8 is a flow chart illustrating steps of a booting method for the control system according to one embodiment of the disclosure.

FIG. 8 is a flow chart illustrating steps of a booting method for the control system 100' according to one embodiment of the disclosure. In this embodiment, the booting method is implemented using the processor 1 that executes the firmware structure as shown in FIG. 7.

In step S81, in response to receipt of a booting command (e.g., a user pressing a power button), the processer 1 starts the booting sequence and executes the signature detection module, so as to detect whether the pre-defined signature associated with the booting sequence is present in the main block 222 at the start of the booting sequence of the control system 100'.

Specifically, the processor 1 is configured to detect the pre-defined signature at the end of the firmware program file stored in the main block 222. When the pre-defined signature is detected, it may be deduced that the firmware program file is completely stored in the main block 222, and the booting sequence may be completed and the method is terminated. Otherwise, it may be deduced that the firmware program file may be damaged or is incompletely stored in the main block 222 (e.g., the previous flashing operation did not complete, resulting in the failure to include the pre-defined signature at the end of the firmware program file), and the flow proceeds to step S82.

In step S82, the processor 1 executes the booting module, and performs the operations of power management and pin initiation included in the booting sequence. In this case, it is determined that the firmware program file stored in the main block 222 is incomplete, and some of the operations included in the booting sequence may not be available. As such, the instructions included in the booting module may ensure that at least the operations of power management and pin initiation associated with the processing unit 10' of the control system 100' may be implemented without trouble.

Then, in step S83, the processor 1 may generate a message indicating that the firmware program file is not complete, and needs to be updated. The processor 1 may then present the message using a display screen or an audio output component (not depicted in the drawings).

At this step, the processor 1 further determines whether a flashing command and an update firmware program file are received from the input module 30'. When the flashing command and the update firmware program file are received from the input module 30', the flow proceeds to step S84. It is noted that in this embodiment, no backup firmware program file is stored in the memory module 2', and the update firmware program file is provided via the input module 30' (e.g., from a cloud server, an externally connected storage device such as a flash drive, etc.).

Figure 9:
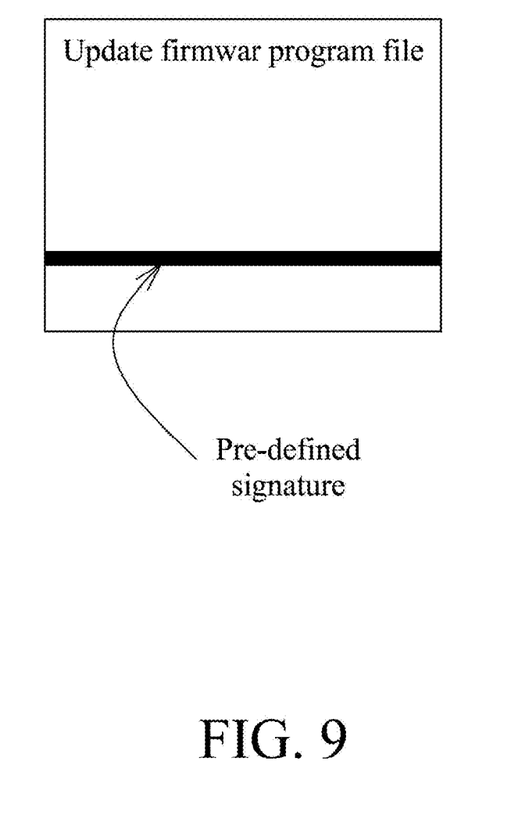
FIG. 9 illustrates an exemplary update firmware program file.

As shown in FIG. 9, the update firmware file includes a pre-defined signature attached at an end of the update firmware file.

In step S84, in response to receipt of the flashing command and the update firmware program file, the processor 1 executes the flashing module, and performs the flashing operation that includes overwriting the firmware program file with the update firmware program file.

In some embodiments, after the flashing operation is completed, the flow may go back to step S81 again, so as to determine whether the flashing operation is successfully implemented. That is to say, the processor 1 may determine again whether the pre-defined signature is detected at the end of the firmware program file stored in the main block 222. When it is determined that the flashing operation is not successfully implemented, the flow may proceed to steps S82 to S84 to perform the flashing operation again.

One embodiment of this disclosure is a computer program product embodied on a non-transitory computer readable medium. The non-transitory computer readable medium is embodied using, for example, the firmware block 22 that includes the boot block 221 and the main block 222. The computer program product is in a form of a firmware structure, and includes a firmware program file that is stored in the main block 222 of the memory module 2, a signature detection module that is stored in the boot block 221 of the memory module 2, a booting module that is stored in the boot block 221 of the memory module, a flashing module that is stored in the boot block 221 of the memory module 2, and a program identifying module that is stored in the boot block 221 of the memory module 2.

To sum up, the embodiments of the disclosure provide a firmware structure stored in a control system and a booting method for the control system. The firmware structure includes different modules such that when the control system is powered on for a booting sequence, a signature detection module causes a processor of the control system to detect whether there is a pre-defined signature at the end of the firmware program file, so as to determine whether the firmware program file is intact (after the latest update). If not, a booting module causes the processor of the control system to perform operations of power management and pin initiation included in the booting sequence, so as to ensure that the control system is capable of performing the basic functions. A flashing module enables the processor to perform the flashing operation for updating the firmware program file that is incomplete, using a backup firmware program file or an externally obtained update firmware program file. Using such a firmware structure, the booting sequence may be completed even if the firmware program file is incomplete.

Additionally, a program identifying module that is stored in a boot block of a memory module of the control system causes the processor to perform, after the booting sequence has completed, in response to receipt of an input code, the operation of determining whether the input code is identical to one of multiple headers, and when it is determined that the input code is identical to one of the headers, executing one of multiple sub-programs that is associated with the one of the headers. In this manner, the maintenance of the firmware program file that includes a plurality of sub-programs may be made more convenient, specifically in the cases that a number of different firmware program files with potentially different sets of sub-programs are present.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A computer program product embodied on a non-transitory computer readable medium of a control system, the non-transitory computer readable medium including a main block and a boot block that are separate from each other, the computer program product comprising:
   a firmware program file that is stored in the main block;
   a signature detection module that is stored in the boot block, the signature detection module including instructions that, when executed by a processor of the control system, cause the processor to perform, at the start of a booting sequence of the control system, operations of detecting whether a pre-defined signature associated with the booting sequence is present in the main block;
   a booting module that is stored in the boot block, the booting module including instructions that, when executed by the processor, cause the processor to perform, after it is determined that the pre-defined signature is not present in the main block, operations of power management and pin initiation included in the booting sequence; and
   a flashing module that is stored in the boot block, the flashing module including instructions that, when executed by the processor, cause the processor to perform, in response to receipt of a flashing command, a flashing operation that includes overwriting the firmware program file with another firmware program file,
   wherein detection of the pre-defined signature being present at the end of the firmware program file indicates a firmware program file being completely stored in the main block, and detection that the pre-defined signature not being present at the end of the firmware program file indicates a firmware program file being incompletely stored in the main block.

2. The computer program product of claim 1, wherein said another firmware program file is received along with the flashing command.

3. The computer program product of claim 1, the control system including a memory module that includes a file block which stores a backup firmware program file, wherein the flashing command includes a locator of the file block of the memory module, and the flashing operation includes accessing the file block of the memory module based on the locator, and overwriting the firmware program file with the backup firmware program file serving as said another firmware program file.

4. The computer program product of claim 1, wherein:
   the firmware program file includes a plurality of sub-programs, each of the plurality of sub-programs including a unique header at a beginning of the sub-program; and
   the computer program product further comprises a program identifying module that is stored in the boot block, the program identifying module including instructions that, when executed by the processor, cause the processor to perform, after the booting sequence has completed, in response to receipt of an input code, the operation of determining whether the input code is identical to one of the headers respectively of the sub-programs, and when it is determined that the input code is identical to one of the headers, executing one of the sub-programs that is associated with the one of the headers.

5. A method for booting a control system, the control system including a processor and a memory module that includes a main block which stores a firmware program file therein, and a boot block which stores a signature detection module, a booting module, and a flashing module therein, the method being implemented using the processor and comprising:
   executing the signature detection module to perform, at the start of a booting sequence of the control system, operations of detecting whether a pre-defined signature associated with the booting sequence is present in the main block;
   when it is determined that the pre-defined signature is not present in the main block, executing the booting module to perform operations of power management and pin initiation included in the booting sequence; and
   executing the flashing module to perform, in response to receipt of a flashing command, a flashing operation that includes overwriting the firmware program file with another firmware program file;
   after the flashing operation is completed:
      executing the signature detection module to perform the operation of detecting whether the pre-defined signature associated with the booting sequence is present in the main block;
      when it is determined that the pre-defined signature is not present in the main block, executing the booting module to perform the operations of power management and pin initiation included in the booting sequence;
      executing the flashing module to perform, in response to receipt of a flashing command, the flashing operation again; and
      executing the signature detection module to perform the operations of detecting whether the pre-defined signature associated with the booting sequence is present in the main block again,
   wherein detection of the pre-defined signature being present in the main block indicates the firmware program file being completely stored in the main block, and detection of the pre-defined signature not being present in the main block indicates the firmware program file being completely stored in the main block.

6. The method of claim 5, wherein the firmware program file and the update firmware program file each have the pre-defined signature attached at an end thereof.

7. The method of claim 6, wherein the update firmware program file is received along with the flashing command.

8. The method of claim 6, a backup firmware program file being stored in a file block of the memory module, wherein the flashing command includes a locator of the file block of the memory module, and the flashing operation includes accessing the file block of the memory module based on the locator, and overwriting the firmware program file with the backup firmware program file serving as said another firmware program file.

9. The method of claim 5, the firmware program file including a plurality of sub-programs, each of the plurality of sub-programs including a unique header at a beginning of the sub-program, the boot block further storing a program identifying module, the method further comprising:
    after the booting sequence has completed, in response to receipt of an input code, executing the program identifying module to perform the operation of determining whether the input code is identical to one of the headers, and when it is determined that the input code is identical to one of the headers, executing one of the sub-programs that is associated with the one of the headers.

* * * * *